United States Patent
Nonaka (10) Patent No.: US 8,184,634 B2
(45) Date of Patent: May 22, 2012

(54) PACKET TRANSFER METHOD AND NODE APPARATUS

(75) Inventor: Naomichi Nonaka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 346 days.

(21) Appl. No.: 12/638,047

(22) Filed: Dec. 15, 2009

(65) Prior Publication Data

US 2010/0189118 A1    Jul. 29, 2010

(30) Foreign Application Priority Data

Jan. 27, 2009    (JP) ................. 2009-015729

(51) Int. Cl.
*H04L 12/28*    (2006.01)
(52) U.S. Cl. ...................... 370/392; 370/401
(58) Field of Classification Search .......... None
See application file for complete search history.

(56) References Cited

U.S. PATENT DOCUMENTS

| | | | |
|---|---|---|---|
| 7,599,303 B2 * | 10/2009 | Nadeau et al. ......... | 370/248 |
| 2004/0052257 A1 * | 3/2004 | Abdo et al. ............ | 370/392 |
| 2008/0267185 A1 * | 10/2008 | Biskner ................. | 370/392 |

FOREIGN PATENT DOCUMENTS

JP    2004-056293    2/2004

OTHER PUBLICATIONS

P. Agarwal et al.; Time to Live (TTL) Processing in Multi-Protocol Label Switching (MPLS) Networks; Network Working Group; The Internet Society Jan. 2003.
Internet Protocol; Information Sciences Institute; University of Southern California; http://www.ieif.org/rfc/rfc0791.txt?number=791.

* cited by examiner

*Primary Examiner* — Duc C Ho
(74) *Attorney, Agent, or Firm* — Antonelli, Terry, Stout & Kraus, LLP.

(57) ABSTRACT

In a L2VPN, where Ethernet frames are encapsulated and transferred, when an edge node disposed at an entrance of the L2VPN encapsulates an Ethernet frame, the data type of the payload of the Ethernet frame is checked. If the payload data type includes time-to-live (TTL) information, whether to encapsulate or discard the frame is judged according to the TTL value. One material for judging whether to discard the frame is a condition that the TTL value is larger than '1' and smaller than a predetermined threshold.

12 Claims, 10 Drawing Sheets

TTL THRESHOLD MANAGEMENT TABLE
2200

| COMMUNICATION INTERFACE NUMBER /2201 | TTL THRESHOLD /2202 |
|---|---|
| COMMUNICATION INTERFACE NUMBER | TTL THRESHOLD |
| COMMUNICATION INTERFACE NUMBER | TTL THRESHOLD |
| COMMUNICATION INTERFACE NUMBER | TTL THRESHOLD |

FIG. 10

PACKET TRANSFER METHOD AND NODE APPARATUS

CLAIM OF PRIORITY

The present application claims priority from Japanese patent application JP 2009-015729 filed on Jan. 27, 2009, the contents of which are hereby incorporated by reference into this application.

BACKGROUND OF THE INVENTION

1. Field of the Invention

The present invention relates to packet transfer methods and node apparatuses, and more specifically, to a packet transfer method and a node apparatus that can suppress an increase in unnecessary traffic when the route is looped because of incorrect routing information or the like.

2. Description of the Related Art

As indicated in RFC 791, a time-to-live (TTL) field is provided in an Internet Protocol (IP) header, so that infinite packet transfer can be avoided even if the route is looped because of a mismatch occurring in routing information.

More specifically, a source node from which an IP packet is sent sets the TTL value to a relatively large positive value ('64,' for example) when it sends the packet, and a node (a router or the like) that transfers the IP packet decreases the value of the TTL field in the IP header by ⊥ each time the packet is transferred. An IP transfer function is defined not to transfer but to discard a packet if its TTL value reaches '0.'

The loop prevention method using TTL is one of the basic functions of the IP, and technologies such as the one disclosed in Japanese Unexamined Patent Application Publication No. 2004-56293 are provided to improve the effectiveness of the method. In the technology disclosed in this patent document, for example, the entry corresponding to a packet discarded because the TTL value had reached '0' is marked in a transfer table, and the entry indicates that the packet was discarded.

Recently, the multiprotocol label switching (MPLS) technology and the generalized MPLS (GMPLS) technology are widely used to form a virtual private network (VPN) on a network and to implement multi-layered routing control or quality of service (QoS) control. As indicated in RFC 3443, how to deal with the TTL when the MPLS is used is also specified, and loop prevention is implemented even through a tunnel.

SUMMARY OF THE INVENTION

The loop prevention using the TTL is effective in the layer 3 VPN (L3VPN), where encapsulation is performed and an MPLS tunnel is formed on the IP layer. In the layer 2 virtual private network (L2VPN), where encapsulation is performed and an MPLS tunnel is formed on the Ethernet layer (Ethernet is a registered trademark), the loop prevention using the TTL included in the MPLS header cannot be performed because the Ethernet header does not have the TTL field. Accordingly, the loop prevention is carried out by a loop prevention technique such as spanning tree protocol (STP) on the Ethernet layer after the exit of the MPLS tunnel. This sometimes allows unnecessary traffic to pass the MPLS tunnel.

Accordingly, it is an object of the present invention to provide a packet transfer method and a node apparatus that discard an unnecessary packet at the entrance of the tunnel according to the TTL value of the IP packet even in the L2VPN, where encapsulation is performed on the Ethernet layer. Another object of the present invention is to suppress an increase in traffic in the MPLS tunnel even if the routing information is incorrect.

To achieve the foregoing objects, the present invention provides a packet transfer method in which, in an L2VPN, where Ethernet frames are encapsulated and transferred, when an edge node disposed at the entrance of the L2VPN encapsulates an Ethernet frame, it interprets the Ethernet payload and judges from the TTL value in the payload whether the encapsulation is necessary.

More specifically, whether the Ethernet payload is an IP packet is judged according to the type value in the Ethernet header. If the payload is an IP packet, whether the Ethernet frame is encapsulated and transferred or discarded is determined on the basis of the value of the TTL field (TTL value) in the header of the IP packet.

The determination condition is that the TTL value is smaller than the threshold value and larger than '1', for example. The frame satisfying this condition is discarded. If the TTL value is '1', the frame is used for communication between adjacent nodes by the routing protocol or the like (communication of control packet, router advertisement, for example). Therefore, the frame having the TTL value set to '1' is not discarded but transferred.

According to the first solving means of this invention, there is provided a packet transfer method in a layer 2 VPN where an Ethernet frame that includes IP header information is encapsulated and transferred, comprising:

a step in which, when an edge node being disposed on a boundary between the layer 2 VPN and another network encapsulates the Ethernet frame, the edge node references a time-to-live (TTL) value in the IP header information and discards the Ethernet frame if the TTL value is larger than '1' and smaller than the threshold stored in the memory.

According to the second solving means of this invention, there is provided a node apparatus in a layer 2 VPN, where an Ethernet frame that includes IP header information is encapsulated and transferred, the node apparatus being disposed on a boundary between the layer 2 VPN and another network, the node apparatus comprising:

a memory for storing a predetermined threshold; and a edge node for encapsulating and transferring the Ethernet frame, wherein when the edge node encapsulates the Ethernet frame, the edge node references a time-to-live (TTL) value in the IP header information and discards the Ethernet frame if the TTL value is larger than '1' and smaller than the threshold stored in the memory.

According to the present invention, it is possible to provide a packet transfer method and a node apparatus that discard an unnecessary packet at the entrance of the tunnel according to the TTL value of the IP packet even in the L2VPN, where encapsulation is performed on the Ethernet layer. According to the present invention, it is possible to suppress an increase in traffic in the MPLS tunnel even if the routing information is incorrect.

DESCRIPTION OF THE PREFERRED EMBODIMENTS

An embodiment will be described below with reference to the drawings.

Figure 1:
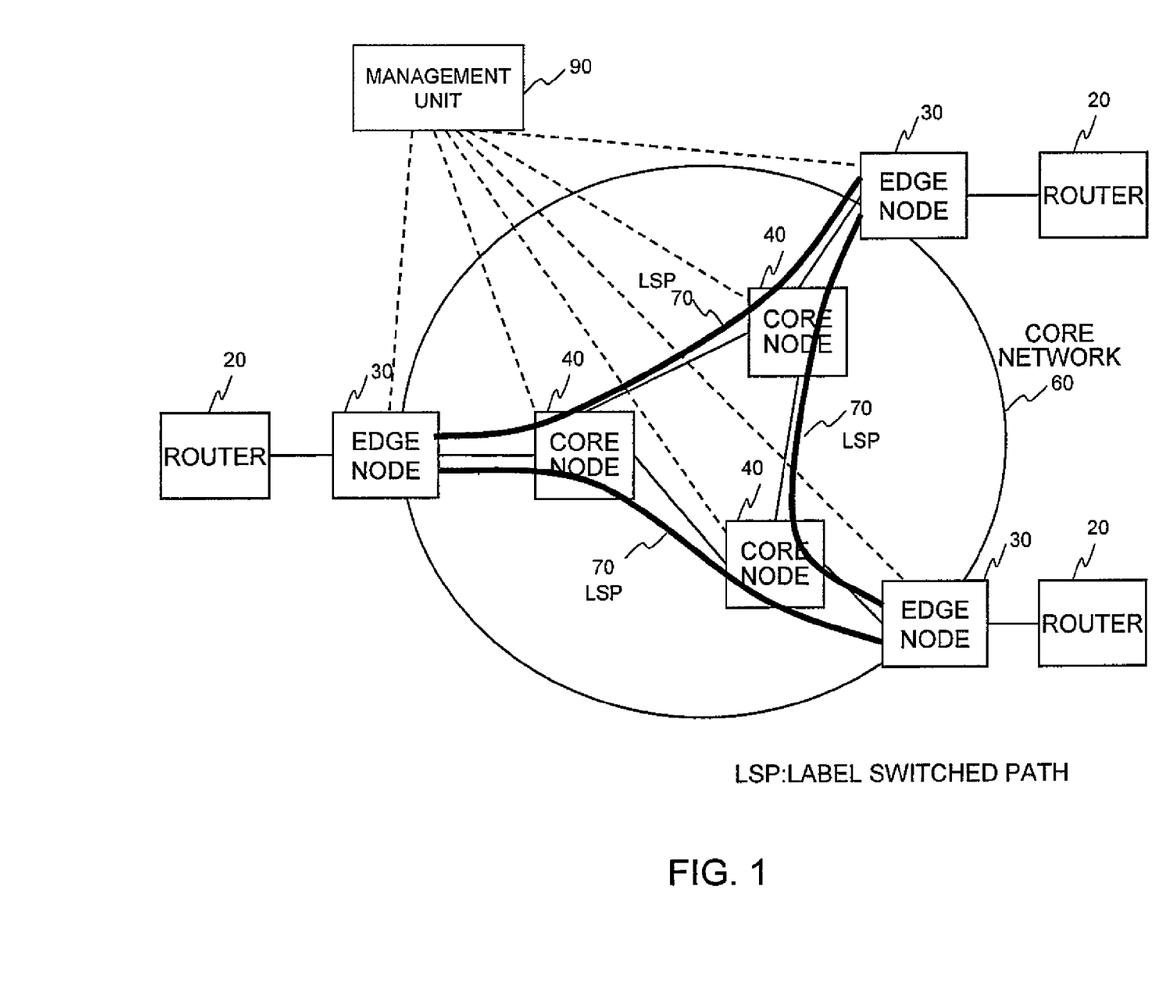
FIG. 1 is a diagram showing the structure of a network in an embodiment.

FIG. 1 shows the structure of a network in the embodiment.

The network includes routers 20 and a core network 60, for example. Each of the routers 20 is a unit that transfers IP packets and is connected to an edge node 30 through an interface utilizing the Ethernet technology. The core network 60 is an L2VPN, for example, and includes the edge nodes 30, core nodes 40, and a management unit 90. Appropriate numbers of edge nodes 30 and core nodes 40 can be included.

The edge node 30 encapsulates an Ethernet frame sent from the router 20 into an MPLS packet and sends it to the core node 40, and also takes out an Ethernet frame from an MPLS packet sent from the core node 40 by removing the header and sends it to the router 20. The edge node 30 is placed on the boundary (entrance and exit) between the core network 60 and another network such as the router 20.

The core node 40 transfers MPLS packets.

The management unit 90 is an apparatus that establishes a data path from a node to another node by setting up a plurality of nodes in a network and managing the configuration of the nodes, which is generally called an element management system (EMS). The management unit 90 establishes a plurality of label switched paths (LSPs) 70 between different edge nodes 30 on the core network 60, and the routers 20 work through the LSPs 70 as if the routers 20 were directly connected by the Ethernet.

The packet transfer method is implemented on the edge nodes 30.

Figure 2:
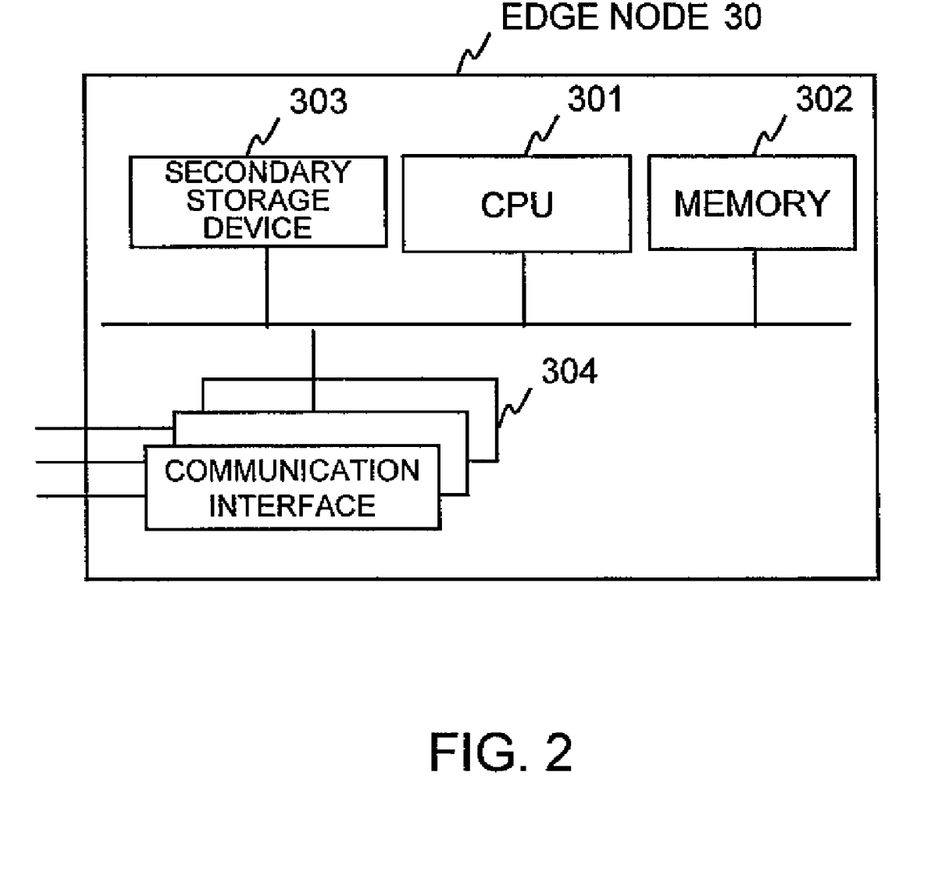
FIG. 2 is a diagram showing the structure of an edge node 30.

FIG. 2 shows the structure of the edge node 30.

The edge node 30 includes a central processing unit (CPU) 301, a memory 302, and communication interfaces 304, for example. A secondary storage device 303 may also be included.

The CPU 301 encapsulates an Ethernet frame and transfers it to the core network 60. The CPU 301 also receives an encapsulated Ethernet frame from the core network 60, decapsulates it, and transfers it to the router 20. The memory 302 stores a predetermined TTL threshold, for example.

The communication interface 304 is provided for communication with the core node 40 or the router 20.

Figure 3:
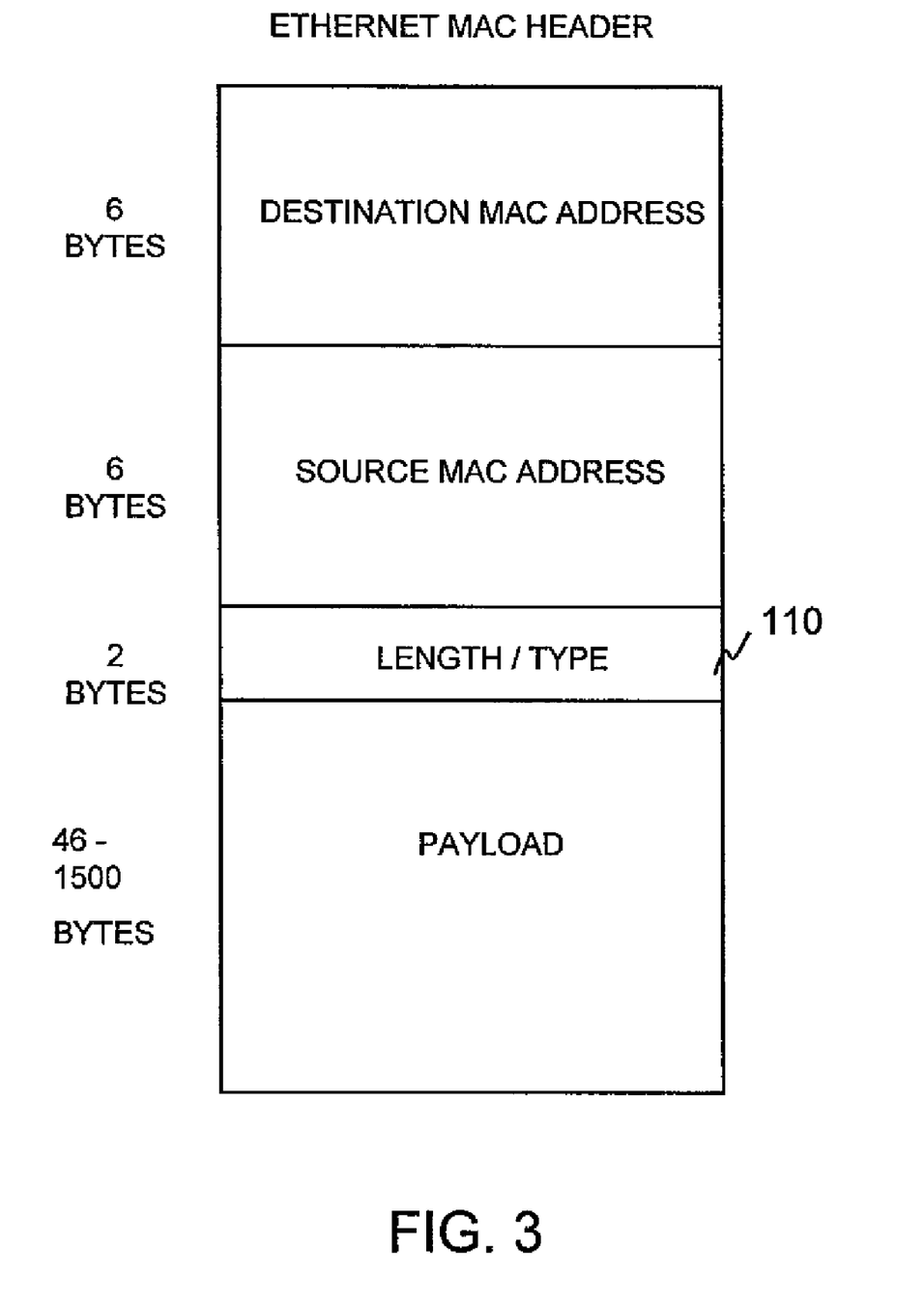
FIG. 3 is a diagram showing the data structure of an Ethernet MAC frame.

FIG. 3 shows the structure of an Ethernet MAC frame.

The MAC frame is a data transfer unit on the Ethernet, and includes a six-byte destination address, a six-byte transmission source address, a two-byte length-type field 110, and a payload. The value of the length-type field 110 determines the data type of the payload. The payload contains an IP header and an IP payload, for example.

Figure 4:
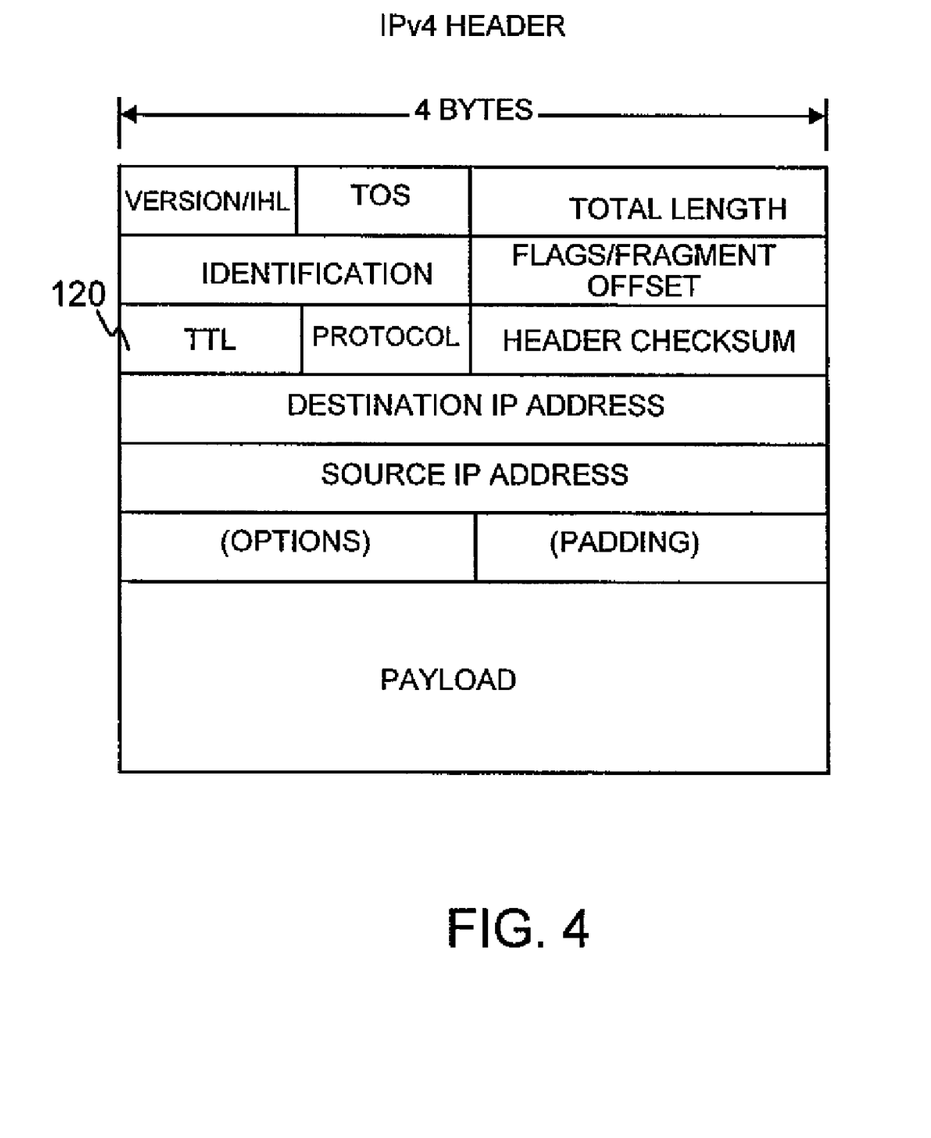
FIG. 4 is a diagram showing the data structure of an IPv4 packet.

FIG. 4 shows the structure of a packet in IP version 4 (IPv4).

An IPv4 header contains a variety of information, including a one-byte TTL field 120 in a position offset by eight bytes from the top of the header. The TTL value ranges from 0 to 255. Details of the IP header are defined in the RFC 791, for example, and a detailed description thereof is omitted here.

Figure 5:
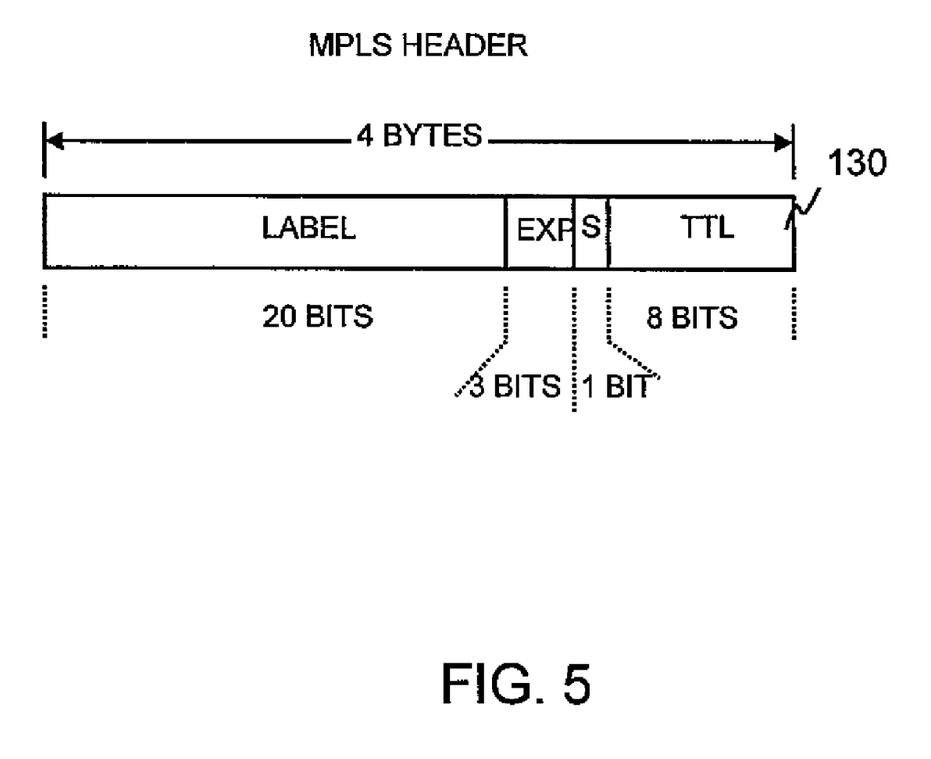
FIG. 5 is a diagram showing the data structure of an MPLS header.

FIG. 5 shows the structure of an MPLS header.

The MPLS header is four bytes long, and includes a label field, an EXP field, an S flag, and a TTL field 130.

The fields and flag are defined in the MPLS protocol, and they will not be described here in detail. In the system of this embodiment, a new TTL value for a tunnel is assigned to the TTL field 130, independently of the value of the TTL field 120 in the IP header. Accordingly, the TTL value of the IP header cannot be referenced in the tunnel (for example, by the core node 40), so that a frame that should be discarded with reference to the TTL value in the IP header would flow in the core network 60 or looped.

Figure 6:
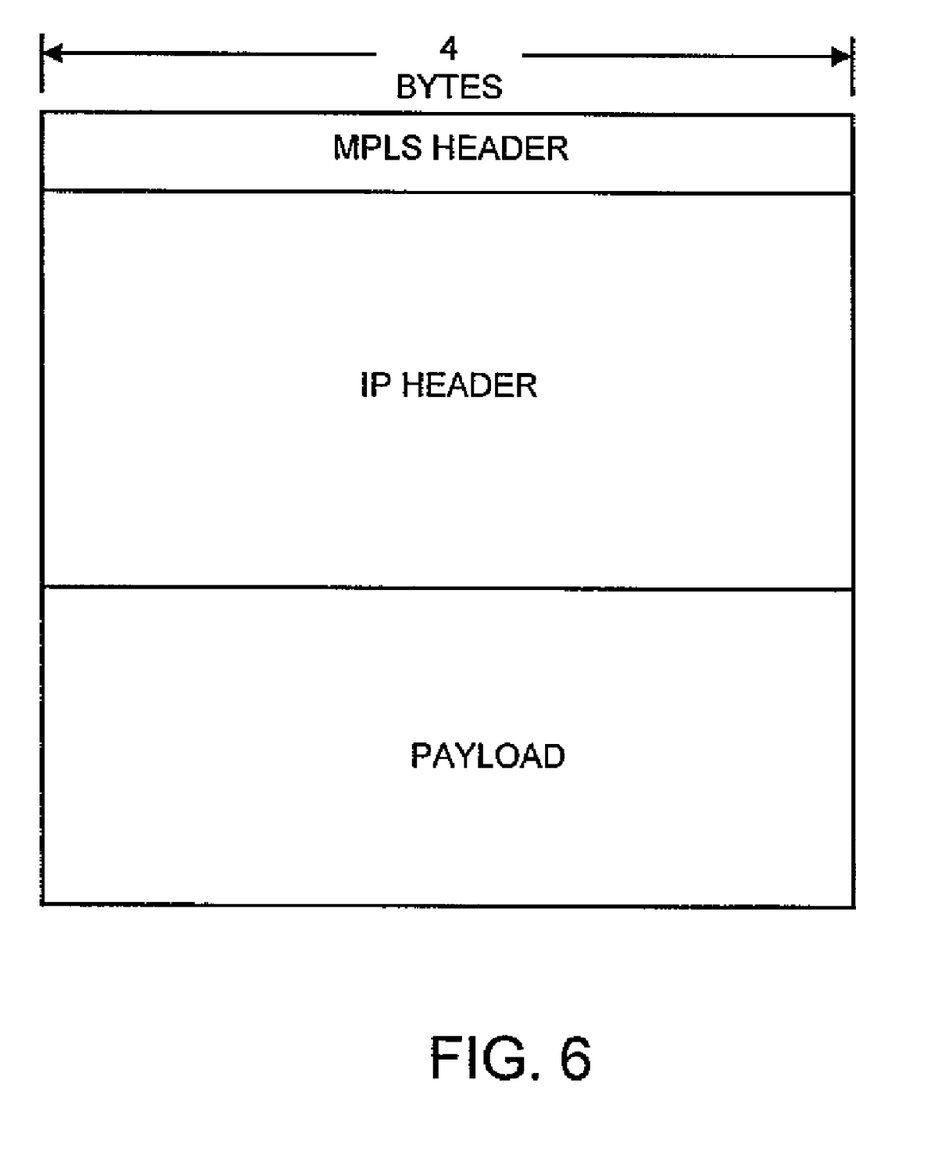
FIG. 6 is a diagram showing a data structure in an L3VPN.

FIG. 6 shows a data structure used when an L3VPN IP packet is encapsulated directly for the MPLS. In the L3VPN, the IP header immediately follows the MPLS header, as shown in the figure.

Figure 7:
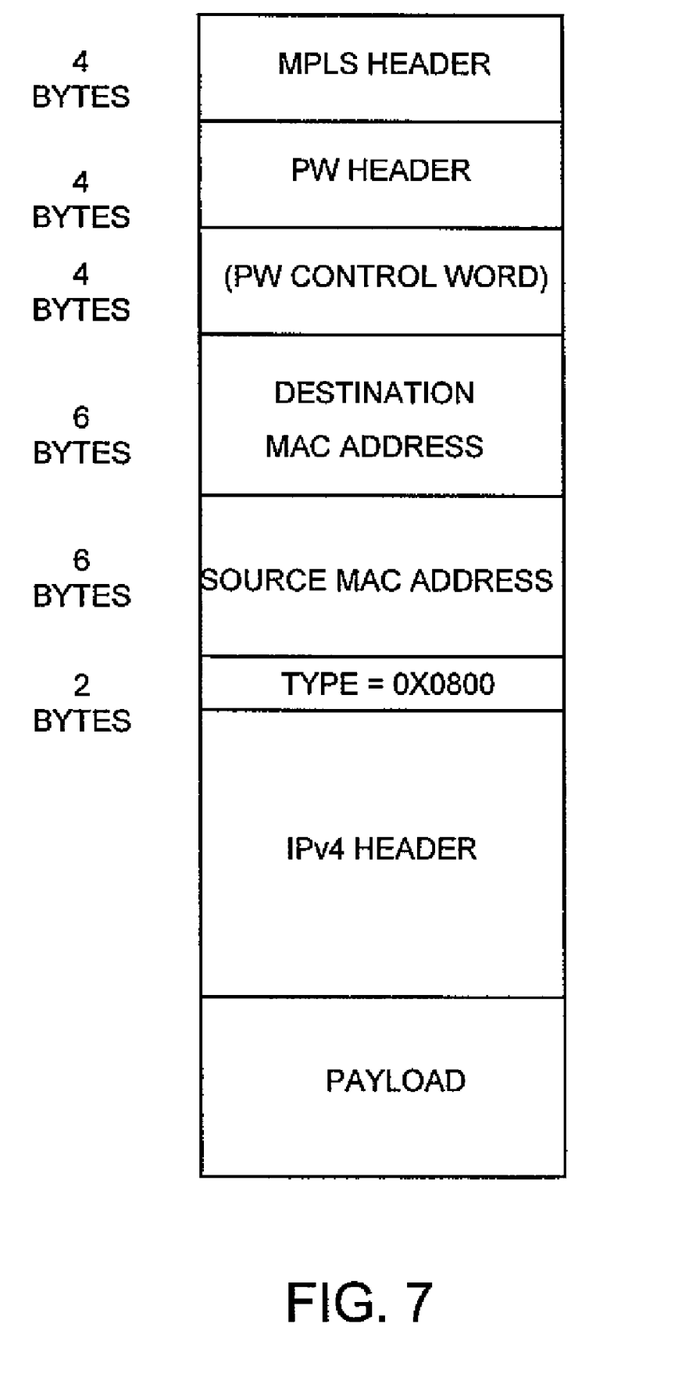
FIG. 7 is a diagram showing a data structure in an L2VPN.

FIG. 7 shows a data structure used when an L2VPN Ethernet frame is encapsulated by using the pseudo wire emulation edge-to-edge (PWE3) technology.

The PWE3 technology is provided to encapsulate and transfer data on the data link layer of the synchronous digital hierarchy (SDH), the point-to-point protocol (PPP) and many other types as well as the Ethernet. The Ethernet encapsulation method is defined in the RFC 4448.

Figure 8:
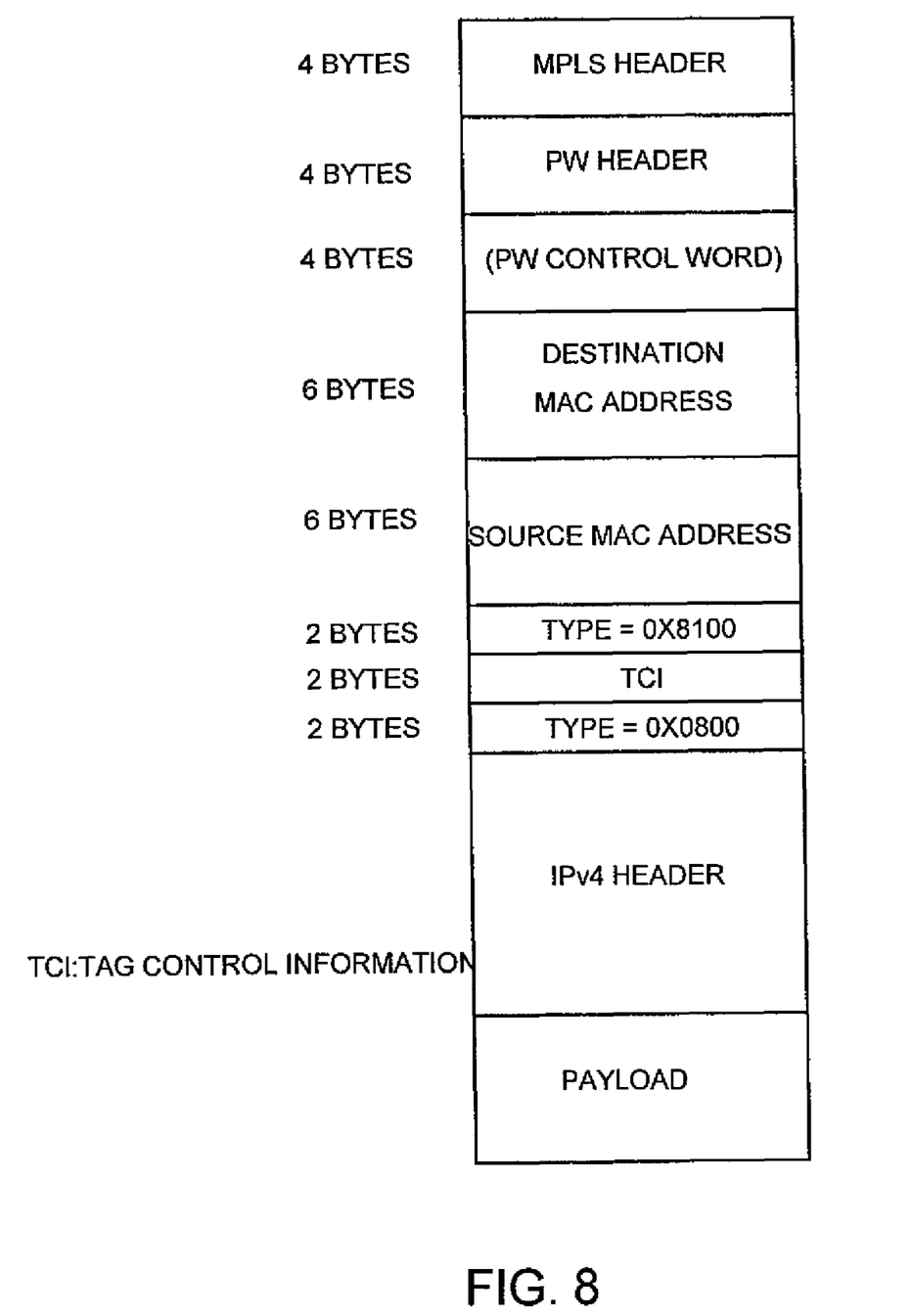
FIG. 8 is a diagram showing another data structure in an L2VPN.

Like FIG. 7, FIG. 8 shows a data structure used when an Ethernet frame is encapsulated by using the PWE3 technology. FIG. 8 differs from FIG. 7 in that the Ethernet frame has a VLAN structure. The Ethernet VLAN is defined in the IEEE 802.1Q. Even if an IP packet is stored in the Ethernet payload, the offset value of the IP header from the Ethernet header is not constant and depends on the type value in the Ethernet header.

Figure 10:
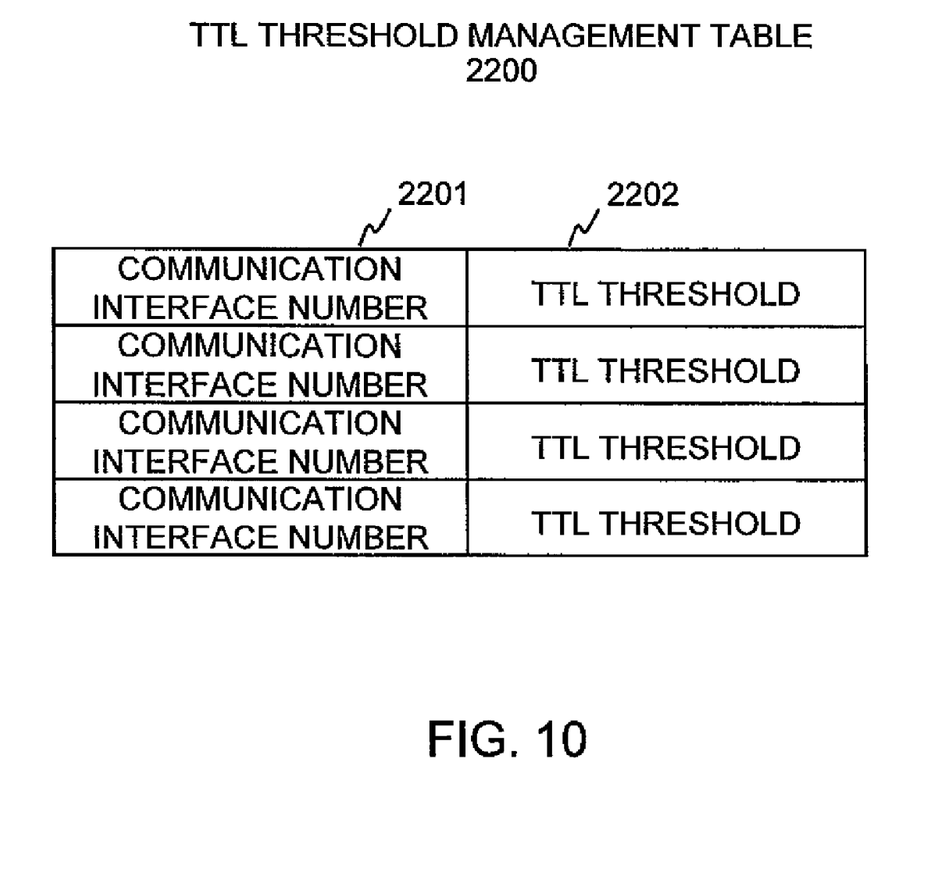
FIG. 10 is a diagram showing the structure of a TTL threshold management table 2200.

FIG. 10 shows the structure of a TTL threshold management table 2200.

The TTL threshold management table 2200 is stored in the memory 302 of the edge node 30, for example. The TTL threshold management table 2200 has two fields, a communication interface number field 2201 and a TTL threshold 2202, for example, and holds the TTL threshold of each of the communication interfaces 304 of the edge node 30. Instead of storing the TTL threshold of each of the communication interface number fields 2201, one TTL threshold value or an appropriate number of TTL threshold values may be stored. The TTL threshold may be determined appropriately by the management unit 90, may be determined in accordance with the number of nodes included in the LSP 70, or may be determined in any other appropriate method.

The TTL threshold is a predetermined value not smaller than '2', for example. A value from 10 to 15 can be used, for example. The number of hops between the edge nodes 30 may be obtained according to the structure and scale of the core network 60 to set the TTL value to a value a little larger than the obtained number of hops.

Figure 9:
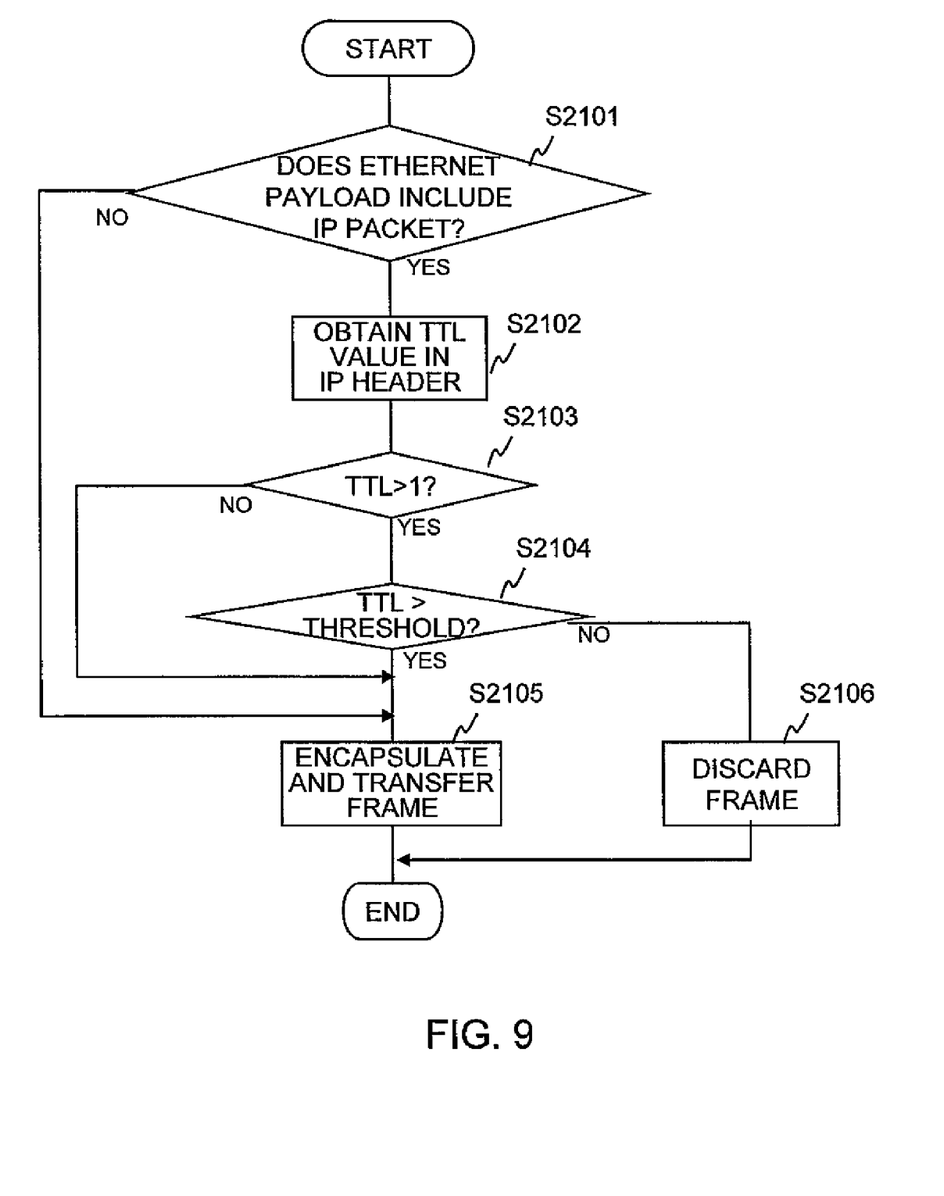
FIG. 9 is a flowchart illustrating encapsulation processing.

FIG. 9 is a flowchart illustrating Ethernet frame encapsulation processing in the edge node 30.

In the encapsulation processing, the edge node 30 (CPU 301, for example) checks, in step 2101, the type value 110 in the MAC header of the frame to see whether the payload of the Ethernet frame includes an IP packet. If an IF packet is not included, the processing goes to step 2105.

If an IP packet is included, the processing goes to step 2102, where the value of the TTL field 120 in the IP header is obtained. Then, in step 2103, the edge node 30 checks whether the obtained TTL value is larger than '1'. If the value is larger than '1', the processing proceeds to step 2104. Otherwise, the processing proceeds to step 2105.

In step 2104, the edge node 30 obtains the TTL threshold corresponding to the communication interface 304 that will send the frame, with reference to the TTL threshold management table 2200, and checks whether the TTL value is larger than the TTL threshold. If the value is larger, the processing proceeds to step 2105. Otherwise, the processing proceeds to step 2106. The processing to be performed when the TTL value matches the TTL threshold can be specified appropriately.

In step 2105, the edge node 30 encapsulates and transfers the Ethernet frame. The usual transfer processing in an MPLS edge node can be used in this step, for example, and a detailed description thereof is omitted here.

If the processing proceeds to step 2106, the edge node 30 discards the Ethernet frame and ends the processing.

Even if the route is looped due to a mismatch in routing information or the like and if a great number of IP packets are duplicated and transferred, the edge node 30 can carry out the Ethernet frame encapsulation as described above to suppress an increase in the amount of data transferred in the core network 60 because the duplication of the packets is stopped before the TTL value reaches zero.

As has been described above, the packet transfer method of the present invention can prevent the amount of data transferred in the core network from increasing greatly even if the transfer path is looped because of incorrect routing information. The method is greatly effective in Ethernet VPNs.

The present invention can be applied to a system using an Ethernet VPN, for example.

What is claimed is:

1. A packet transfer method in a layer 2 VPN where an Ethernet frame that includes IP header information is encapsulated and transferred, comprising:
   a step in which, when an edge node being disposed on a boundary between the layer 2 VPN and another network encapsulates the Ethernet frame, the edge node references a time-to-live (TTL) value in the IP header information and discards the Ethernet frame if the TTL value is larger than '1' and smaller than the threshold stored in the memory.

2. The packet transfer method according to claim 1, wherein the edge node encapsulates and transfers the Ethernet frame to the layer 2 VPN if referenced TTL value is '1'.

3. The packet transfer method according to claim 1, wherein the edge node encapsulates and transfers the Ethernet frame to the layer 2 VPN if referenced TTL value is not smaller than the threshold.

4. The packet transfer method according to claim 1, wherein the edge node references a type field in the Ethernet frame to check whether a payload of the Ethernet frame includes an IP packet.

5. The packet transfer method according to claim 1, wherein the threshold is equal to or larger than '2'.

6. The packet transfer method according to claim 1, wherein
   the layer 2 VPN comprises a plurality of edge nodes that are placed on boundaries with other networks and that encapsulate and decapsulate Ethernet frames and core nodes placed among the plurality of edge nodes;
   in the layer 2 VPN, encapsulated Ethernet frames are sent and received between the edge nodes through the core nodes; and
   the core nodes do not perform discard control based on the TTL value in the IP header information, for encapsulated packets.

7. A node apparatus in a layer 2 VPN, where an Ethernet frame that includes IP header information is encapsulated and transferred, the node apparatus being disposed on a boundary between the layer 2 VPN and another network, the node apparatus comprising:
   a memory for storing a predetermined threshold; and
   a edge node for encapsulating and transferring the Ethernet frame,
   wherein
   when the edge node encapsulates the Ethernet frame, the edge node references a time-to-live (TTL) value in the IP header information and discards the Ethernet frame if the TTL value is larger than '1' and smaller than the threshold stored in the memory.

8. The node apparatus according to claim 7, wherein the processing unit encapsulates and transfers the Ethernet frame to the layer 2 VPN if referenced TTL value is '1'.

9. The node apparatus according to claim 7, wherein the processing unit encapsulates and transfers the Ethernet frame to the layer 2 VPN if referenced TTL value is not smaller than the threshold.

10. The node apparatus according to claim 7, wherein the processing unit references a type field in the Ethernet frame to check whether a payload of the Ethernet frame includes an IP packet.

11. The node apparatus according to claim 7, wherein the threshold is equal to or larger than '2'.

12. The node apparatus according to claim 7, wherein
    the layer 2 VPN comprises a plurality of edge nodes that are placed on boundaries with other networks and that encapsulate and decapsulate Ethernet frames and core nodes placed among the plurality of edge nodes;
    the node apparatus is one of the plurality of edge nodes;
    in the layer 2 VPN, encapsulated Ethernet frames are sent and received between the edge nodes through the core nodes; and
    the core nodes do not perform discard control based on the TTL value in the IP header information, for encapsulated packets.

* * * * *